US011865559B2

(12) United States Patent
Tam et al.

(10) Patent No.: US 11,865,559 B2
(45) **Date of Patent: *Jan. 9, 2024**

(54) SPRAY TIP

(71) Applicant: Graco Minnesota Inc., Minneapolis, MN (US)

(72) Inventors: Jimmy Wing Sum Tam, Plymouth, MN (US); Diane L. Olson, Elk River, MN (US); Robert W. Kinne, Columbia Heights, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 203 days.

This patent is subject to a terminal disclaimer.

(21) Appl. No.: 16/688,499

(22) Filed: Nov. 19, 2019

(65) Prior Publication Data

US 2020/0164390 A1 May 28, 2020

Related U.S. Application Data

(60) Provisional application No. 62/772,328, filed on Nov. 28, 2018.

(51) Int. Cl.
*B05B 1/34* (2006.01)
*B05B 12/00* (2018.01)
*B05B 9/01* (2006.01)

(52) U.S. Cl.
CPC .................. *B05B 1/34* (2013.01); *B05B 9/01* (2013.01); *B05B 12/0024* (2018.08)

(58) Field of Classification Search
CPC .......... B05B 1/34; B05B 12/0024; B05B 9/01
USPC ........................................................ 239/461
See application file for complete search history.

(56) References Cited

U.S. PATENT DOCUMENTS

| | | | | |
|---|---|---|---|---|
| 3,362,644 | A | 1/1968 | Parke et al. | |
| 4,074,857 | A * | 2/1978 | Calder | B05B 1/28 239/119 |
| 4,721,251 | A | 1/1988 | Kondo et al. | |
| 5,178,325 | A * | 1/1993 | Nielsen | B05B 1/042 239/1 |

(Continued)

FOREIGN PATENT DOCUMENTS

| | | | |
|---|---|---|---|
| CA | 2955118 | A1 | 10/2016 |
| CN | 105531033 | A | 4/2016 |

(Continued)

OTHER PUBLICATIONS

Extended European Search Report for EP Application No. 19211773.7, dated May 4, 2020, 7 pages.

(Continued)

*Primary Examiner* — Chee-Chong Lee
(74) *Attorney, Agent, or Firm* — Kinney & Lange, P.A.

(57) ABSTRACT

A spray tip includes a cylindrical body having a through hole oriented along a fluid flow axis, and a spray outlet piece and upstream chamber piece located in the through hole. The spray outlet piece includes an outlet aperture configured to atomize a spray fluid. The upstream chamber piece includes an internal aperture wall with an upstream surface and a downstream surface, and an aperture through the wall. The aperture includes an inlet orifice and an outlet orifice. The spray tip further includes a turbulation chamber defined by the spray outlet piece and the upstream chamber piece.

21 Claims, 8 Drawing Sheets

(56) References Cited

U.S. PATENT DOCUMENTS

| | | | | |
|---|---|---|---|---|
| 5,213,270 | A | 5/1993 | Stouffer et al. | |
| 6,264,115 | B1 | 7/2001 | Liska et al. | |
| 8,814,070 | B2 | 8/2014 | Drozd et al. | |
| 2002/0014541 | A1 * | 2/2002 | Krohn | B05B 15/534 239/119 |
| 2016/0228883 | A1 * | 8/2016 | Becker | B05B 9/01 |
| 2016/0296949 | A1 | 10/2016 | Riha | |
| 2016/0303585 | A1 | 10/2016 | Wenzel et al. | |
| 2018/0178228 | A1 | 6/2018 | Kinne et al. | |
| 2018/0185855 | A1 | 7/2018 | Wenzel et al. | |

FOREIGN PATENT DOCUMENTS

| | | | |
|---|---|---|---|
| CN | 108246533 | A | 7/2018 |
| EP | 3342487 | A2 | 7/2018 |
| GB | 2152847 | A | 8/1985 |
| GB | 2288348 | A | 10/1995 |
| WO | WO9803270 | A1 | 1/1998 |

OTHER PUBLICATIONS

First Office Action from CN Application No. 2019111620710, dated Jan. 28, 2021, 19 pages.
Communication Pursuant to Article 94(3) EPC for EP Application No. 19211773.7, dated Jun. 28, 2021, 6 pages.
Second Office Action from CN Application No. 2019111620710, dated Sep. 26, 2021, 14 pages.

* cited by examiner

SPRAY TIP

CROSS-REFERENCE TO RELATED APPLICATION(S)

This application claims the benefit of U.S. Provisional Application No. 62/772,328 filed Nov. 28, 2018 for "Spray Tip" by D. L. Olson, R. W. Kinne, and J. W. Tam.

BACKGROUND

The present invention relates generally to fluid spraying systems. More specifically, the present invention relates to a spray tip.

Fluid spraying systems are commonly used in a wide variety of applications, from industrial assembly to home painting. Hand controlled sprayers can be used by a human operator, while automated sprayers are typically used in mechanized manufacturing processes. Fluid sprayed by such systems conforms to a spray pattern defined, in large part, by aperture shape and size. Various embodiments of the present disclosure can be used to spray paint and/or other solutions. While paint will be used herein as an exemplar, it will be understood that this is merely one example and that other fluids can be sprayed instead of paint.

SUMMARY

A spray tip includes a cylindrical body having a through hole oriented along a fluid flow axis, and a spray outlet piece and upstream chamber piece located in the through hole. The spray outlet piece includes an outlet aperture configured to atomize a spray fluid. The upstream chamber piece includes an internal aperture wall with an upstream surface and a downstream surface, and an aperture through the wall. The aperture includes an inlet orifice and an outlet orifice. The spray tip further includes a turbulation chamber defined by the spray outlet piece and the upstream chamber piece.

DETAILED DESCRIPTION

The present invention is directed to a spray tip assembly comprising abutting upstream and downstream chamber pieces. The upstream chamber piece includes an aperture wall with aperture for constricting fluid flow through the assembly. The upstream and downstream pieces further define a turbulation chamber. These features help improve fluid shearing and spray fan development. Further geometric features of the spray tip assembly allow for improved mechanical properties and potentially, extended service life of the spray tip.

Figure 1:
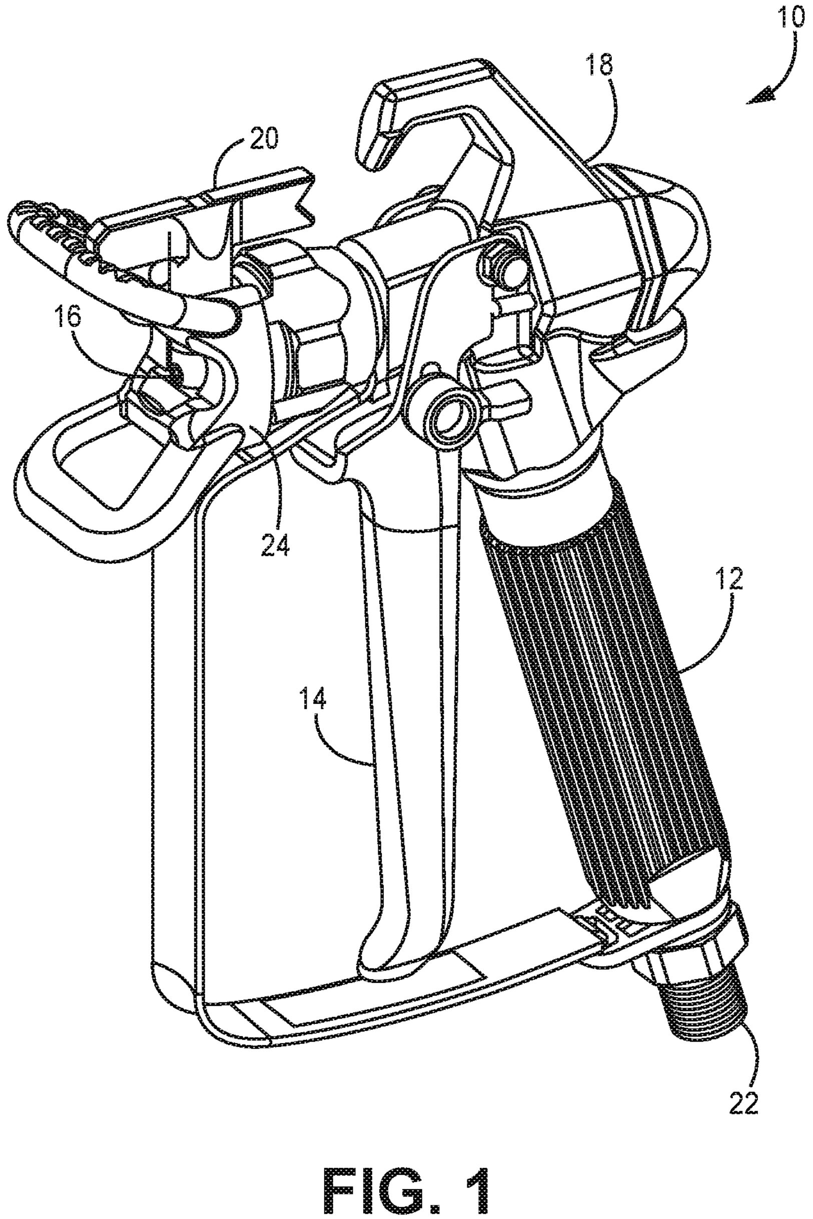
FIG. 1 is a perspective view of a spray gun including a spray tip.

FIG. 1 is a perspective view of spray gun 10, which can be operated to spray paint or other fluids (e.g., water, oil, stains, finishes, coatings, solvents, etc.). Spray gun 10 can be supported and operated by just one hand during spraying. Spray gun 10 includes handle 12 and actuating trigger 12. Actuating trigger 12 operates a valve mechanism (not shown), located within housing 18. Actuating trigger 12 causes paint to be sprayed out of outlet aperture 16 of spray tip 20. Connector 22 receives a flow of paint under pressure from a pump via a supply hose (not shown). Connector 22 can be threaded to attach to a fitting of the supply hose. The pressure of the paint output by the pump and received at connector 22 for spraying can be between 3.48-51.7 MPa (500-7500 psi), with pressures of 10.3-20.7 MPa (1500-3000 psi) being typical. It should be understood that this is but one type of spray gun or sprayer within which the features of the present disclosure could be embodied.

As shown in FIG. 1, spray tip 20 can be inserted into nozzle holder 24 of spray gun 10. Spray tip 20 is easily removable from nozzle holder 24 (and the rest of spray gun 10) to exchange different spray tips 20. Exchanging spray tips 20 can be advantageous, for example, to vary spray patterns, or for cleaning of dirty spray tips 20. Spray tip 20 includes cylindrical body 26 (shown in FIG. 2) that is insertable into nozzle holder 24 to provide a desired spray pattern, as further describe below with reference to FIG. 2. Spray tip 10 is rotatable within nozzle holder 24 so that spray tip 20 can be reversed in direction (i.e., rotated roughly 180° to reverse the direction of flow through spray tip 20 to unclog spray tip 20).

Figure 2:
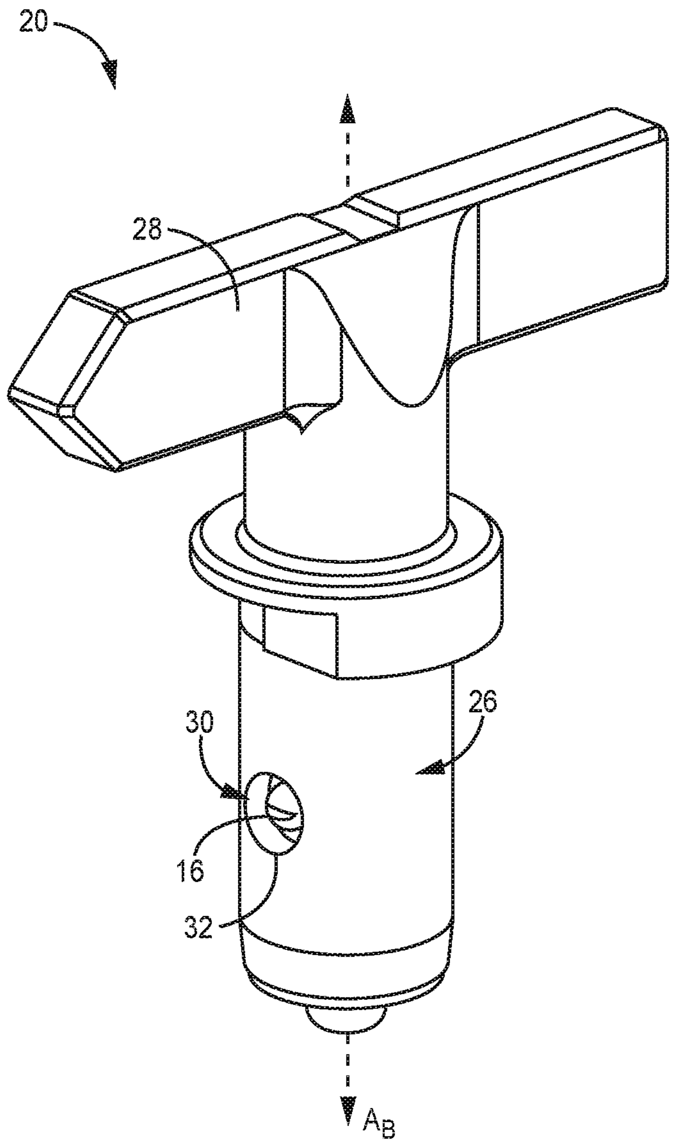
FIG. 2 is a perspective view of the spray tip.

FIG. 2 is a perspective view of spray tip 20, shown for simplicity isolated from spray gun 10. As shown, spray tip 20 includes handle 28 useful for gripping spray tip 20 for removal and/or rotating spray tip 20, as discussed above. Handle 28 may be formed from a polymer material, or other suitable material. Cylindrical body 26 extends downward from handle 28. Cylindrical body 26 can be formed from metallic material, such as steel, although other materials are contemplated herein. Cylindrical body 26 is elongated along body axis AB which is coaxial with cylindrical body 26 (the flow of paint generally being perpendicular to the body axis). Cylindrical body 26 includes through hole 30 which extends through cylindrical body 26 along an axis that is orthogonal to body axis AB. FIG. 2 shows a downstream opening 32 of through hole 30.

Figure 3:
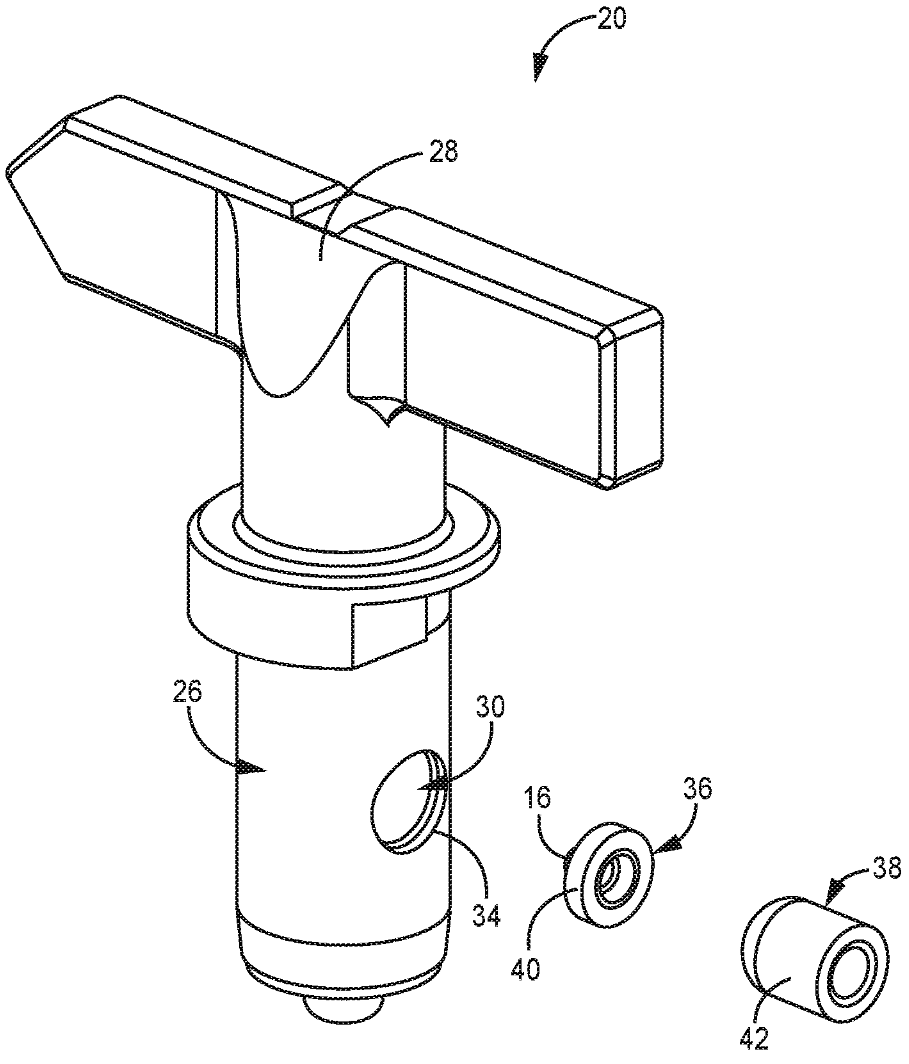
FIG. 3 is a perspective view of the spray tip showing internal components in exploded view.

FIG. 3 shows an exploded view of the components within through hole 30 of cylindrical body 26. The view of FIG. 3 is shifted relative to the view of FIG. 2 to show upstream opening 34 of through hole 30. As shown in FIG. 3, spray outlet piece 36 (i.e., downstream chamber piece) and upstream chamber piece 38 are located within through hole 30. Spray outlet piece 36 can be formed from tungsten carbide or a similar rigid, powder-based material, among other options. Upstream chamber piece 38 can likewise be formed from tungsten carbide or a similar rigid, powder-based material, among other options. However, in an exemplary embodiment, upstream chamber piece 38 is formed from steel, such as stainless steel. Spray outlet piece 36 and upstream chamber piece 38 are each cylindrical components. More specifically, exterior surfaces 40, 42 of spray outlet piece 36 and upstream chamber piece 38, respectively, are cylindrical. The interior of through hole 30 can accordingly have a cylindrical shape in order to accommodate the cylindrical exteriors 40 and 42.

Figure 4:
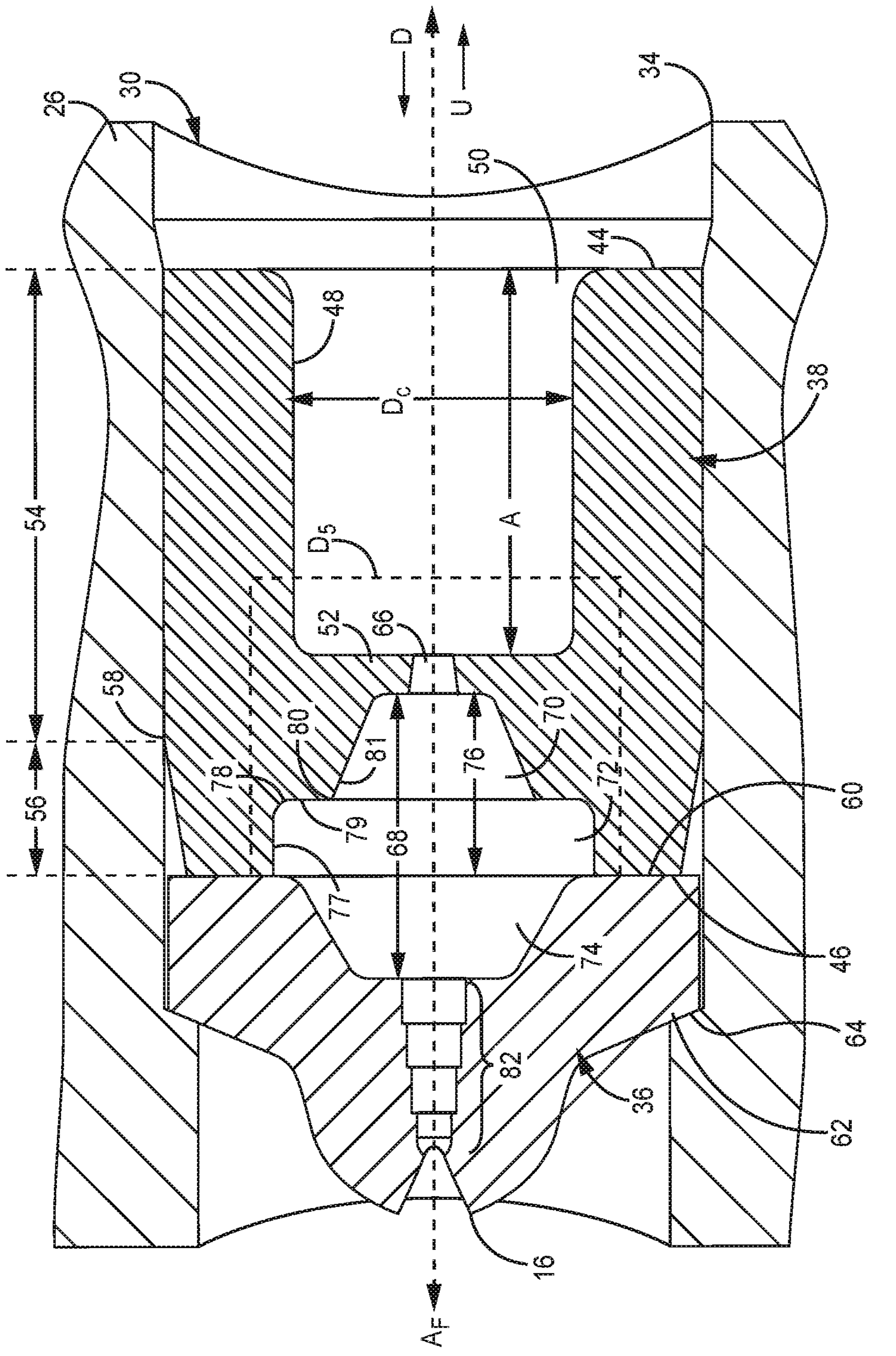
FIG. 4 is a cross-sectional view of the spray tip.

FIG. 4 is a cross-sectional view of spray tip 20 showing spray outlet piece 36 and upstream chamber piece 38 positioned within through hole 30 and stacked in an abutting fashion with respect to flow axis $A_F$. Spray outlet piece 36 and upstream chamber piece 38 define a fluid pathway through the through hole 30 along flow axis $A_F$. Spray outlet piece 36 and upstream chamber piece 38 condition the flow of the fluid and shape the spray pattern. The flow of fluid through spray outlet piece 36 and upstream chamber piece 38 is generally along the indicated flow axis, although as further discussed herein, the flow is intentionally made turbulent along the indicated flow axis within a turbulation chamber 68 (shown in FIG. 4). Fluid flows from the upstream direction to the downstream direction, as indicated along flow axis $A_F$ by arrows U and D respectively. As shown, through hole 30, spray outlet piece 36, and upstream chamber piece 38 are coaxial with flow axis $A_F$. With the exception of the cat-eye shape of outlet aperture 16, spray outlet piece 36 and upstream chamber piece 38 are annularly uniform and symmetric about flow axis $A_F$, such that the cross-sectional view shown in FIG. 4 would be the same regardless of the angle of the cross-section, as long as the view is orthogonal to flow axis $A_F$.

Upstream chamber piece 38 includes upstream end 44, downstream end 46, and channel 48. Upstream chamber piece 38 further includes opening 50 on an upstream side of channel 48. Channel 48 extends lengthwise from opening 50 to aperture wall 52. The length of the channel 48 is marked as dimension A, and can be in the range of 2.54-7.62 mm (0.10-0.30 inches), and preferably in the range of 5.08-7.62 mm (0.20-0.30 inches). Aperture wall 52 is orientated generally orthogonal to flow axis $A_F$. Channel 48 is cylindrical and has a diameter Dc that is consistent throughout most or all of its length. Along its exterior surface 42, upstream chamber piece 38 includes retainer portion 54 and taper portion 56. In the embodiment shown in FIG. 4, retainer portion 54 is generally cylindrical and extends from upstream end 44 of upstream chamber piece 38 to taper edge 58. Taper portion 56 extends downstream from taper edge 58 to downstream end 46 of upstream chamber piece 38. This arrangement leads to the smallest outer diameter of exterior surface 42 of upstream chamber piece 38 being located at downstream end 46 of upstream chamber piece 38.

Upstream chamber piece 38 can be press fit into through hole 30 behind (upstream of) spray outlet piece 36 to keep each chamber piece 36, 38 in place. The nominal (unassembled) outer diameter of retainer portion 54 can be the same as or preferably slightly larger than the nominal inner diameter of through hole 30. These relative dimensions generate a strong interference fit between exterior surface 42 along retainer portion 54 and the interior surface of through hole 30. This interference fit is sufficient to anchor upstream chamber piece 38 within through hole 30 even when the flow of fluid through spray tip 20 is reversed. The interference fit between upstream chamber piece 38 and through hole 30 can be the largest or only force that retains upstream chamber piece 38 and spray outlet piece 36 in place within through hole 30. Therefore, no adhesive, pin, or other retainer may be needed to anchor upstream chamber piece 38 and spray outlet piece 36 in place within through hole 30.

Downstream end 46 of upstream chamber piece 38 abuts upstream end 60 of spray outlet piece 36 such that spray outlet piece 36 is held in place within through hole 30. Downstream end 62 of spray outlet piece 36 abuts shoulder 64 of cylindrical body 26. Shoulder 64 narrows through hole 30 to prevent spray outlet piece 36 from moving further in the downstream direction. Therefore, spray outlet piece 36 is axially held in place between shoulder 64 and downstream end 46 of upstream chamber piece 38, which, as discussed above, is itself anchored within through hole 30 by the interference fit between retainer portion 54 and through hole 30. In the embodiment shown in FIG. 4, there are no intermediary components between upstream chamber piece 38 and spray outlet piece 36. However, in alternative embodiments, one or more intermediary pieces, such as a washer, can be located between upstream chamber piece 38 and spray outlet piece 36.

Upstream chamber piece 38 is preferably formed from steel, such as stainless steel, because steel has greater elasticity to perform the anchoring function of retainer portion 54. Upstream chamber piece 38 can alternatively be formed from another suitable, flexible material. Spray outlet piece 36 is preferably formed from tungsten carbide, which has superior wear resistance from the flow of high-pressure paint. Spray outlet piece 36 can alternatively be formed from another suitable rigid, powder-based material. In some embodiments, upstream chamber piece 38 can also be formed from tungsten carbide.

Taper portion 56 has a reduced outer diameter relative to retainer portion 54, which facilitates press fitting of upstream chamber piece 38 into through hole 30. More specifically, taper portion 56 is angled towards flow axis FA (in the downstream direction) such that the outer diameter of taper portion 56 decreases along flow axis FA in the downstream direction. Correspondingly, the outer diameter of taper portion 56 increases further along flow axis FA in the upstream direction. The outer diameter of taper portion 56 may linearly increase in the upstream direction between downstream end 46 and taper edge 58. As shown in FIG. 4, the outer diameter of taper portion 56 is smaller than the inner diameter of the inner cylindrical surface of through hole 30 that overlaps with taper portion 56, such that taper portion 56 does not contact the inner cylindrical surface of the through hole 30.

The taper profile of upstream chamber piece 38 facilitates easy insertion of downstream end 46 into through hole 30, even though the remainder of exterior surface 42 of upstream chamber piece 38 (i.e., corresponding to retainer portion 54) has an outer diameter similar to or larger than the inner diameter of the inner cylindrical surface of through hole 30. If, during assembly, upstream chamber piece 38 were inserted and forced into through hole 30 at a crooked angle, upstream chamber piece 38 may become jammed, resulting in deformation or other damage to upstream chamber piece 38. This can lead to degradation of and/or premature failure of spray tip 20. Taper portion 56 helps automatically align upstream chamber piece 38 during insertion into through hole 30.

The combined lengths of taper portion 56 and retainer portion 54 define the length of exterior surface 42. The length of taper portion 56 can be balanced with the length of retainer portion 54 to optimize the insertion and securing of upstream chamber piece 38 within though hole 30. For example, if retainer portion 54 is too short, the interference fit between exterior surface 42 of upstream chamber piece 38 and the inner cylindrical surface of through hole 30 may not be sufficient to properly anchor upstream chamber piece 38. However, if taper portion 56 is too short, it may be difficult to properly align upstream chamber piece 38 for insertion into through hole 30. Further benefits of the length of taper portion 56 are discussed herein.

Aperture wall 52 is located at an interior portion of upstream chamber piece 38 and includes aperture 66 extending therethrough. As shown in FIG. 4, aperture 66 is positioned at the center of aperture wall 38, such that aperture 66 is coaxial with flow axis FA. Aperture wall 52 substantially reduces the area of the fluid flow path through upstream chamber piece 38, such that the fluid flow constricts through the relatively small aperture 66. More specifically, the diameter DA (shown in FIG. 6) of aperture 66 can be much smaller than diameter Dc of channel 48 located upstream of aperture 66.

Turbulation chamber 68 is located on a downstream side of aperture wall 52, Turbulation chamber is formed by inner surfaces of both upstream chamber piece 38 and spray outlet piece 36. Turbulation chamber 68 has a wider profile relative to the inlet of turbulation chamber 68 (i.e., aperture 66) and the outlet of turbulation chamber 68 (i.e., either stepped section 82, described in greater detail below, or outlet aperture 16). In operation, aperture wall 52 causes a flow of fluid (e.g., paint) within chamber 48 to move through aperture 66 into turbulation chamber 68. Aperture 66 constricts the flow, and along with varied inner surfaces and diameters of turbulation chamber 68, described in greater detail below, increases turbulence of, and imparts shear on, the fluid flow. More specifically, both turbulating and shearing the fluid temporarily reduces its viscosity, improving atomization of the fluid from outlet aperture 16. Better atomized fluid produces a more uniform spray pattern, which facilitates spraying at lower pressures. Operating at lower pressures allows for reduced power and structural (e.g., spray gun size, individual component design, etc.) requirements for spray gun 10.

Turbulation chamber 68 can be formed by expansion section 70, main section 72, and reduction section 74, which are serially arranged in the upstream to downstream direction. Expansion section 70 can have a frustoconical shape partially defined by flat downstream surface 88 (shown in FIGS. 5 and 6) of aperture wall 52, which is discussed in greater detail below. Expansion section 70 can further have a significantly larger inner diameter than aperture diameter DA. Expansion section 70, as shown, widens in the downstream direction, although in an alternative embodiment, expansion section 70 can have an abrupt (flush) expansion rather than being angled along flow axis FA. Main section 72 is located downstream of expansion section 70 and has a disc-like shape. Main section 72 defines the largest inner diameter of turbulation chamber 68. Main section 72 can further define the largest inner diameter of upstream chamber piece 38. As shown, the inner diameter of main section 72 is constant along flow axis FA. Reduction section 74 is located downstream of main section 72. As shown, reduction section 74 narrows in the downstream direction, such that reduction section 74 has a frustoconical shape. In alternative embodiments, however, reduction section 74 can have a more abrupt (flush) reduction in inner diameter rather than being angled along flow axis FA.

Together, expansion section 70 and main section 72 form turbulation chamber portion 76. More specifically, turbulation chamber portion 76 extends from aperture wall 52 on its upstream side to downstream end 46 of upstream chamber piece 38. Turbulation chamber portion 76 is formed by several features. In particular, the shape of expansion section 70 is different from the shape of main section 72, such that the inner surfaces defining turbulation chamber portion 76 can have different diameters along and angles relative to flow axis FA. Corners within expansion section 70 transition the shapes and the diameters along and between expansion section 70 and main section 72. Corners can also transition a first inner annular surface with a first pitch to a second inner annular surface with a second pitch. More specifically, rounded first corner 78 transitions axial inner surface 77 of main section 72 with a consistent inner diameter along flow axis $A_F$ to flat inner surface 79 that is generally orthogonal to flow axis $A_F$. Pointed second corner 80 transitions from flat inner surface 79 to angled inner surface 81 that defines expansion section 76.

Spray outlet piece 36 further includes stepped section 82 and outlet aperture 16, respectively, located downstream of turbulation chamber 68. Stepped section 82, as shown, includes cylindrical steps that decrease in diameter in the downstream direction. Stepped section 82 can alternatively have a frustoconical or curved shape, tapering in the downstream direction. Outlet aperture 16 can be a domed portion with a cut therein to shape the released fluid into an atomized spray fan. In some embodiments, outlet aperture 16 can have a cat-eye shape to form a flat spray fan.

The high pressure of the fluid within turbulation chamber 68, and the uneven turbulent flow of the paint within turbulation chamber 68, puts uneven and dynamic stresses on the components within turbulation chamber 68, and particularly, corners such as first corner 78 and second corner 80. Moreover, these corners can be susceptible to initiation of cracks in the material that forms upstream chamber piece 38. To relieve strain at these corners and at other geometric features (e.g., walls) within turbulation chamber portion 68 of upstream chamber piece 38, taper portion 56 extends upstream of these corners and other geometric features. This creates a gap between exterior surface 42 of upstream chamber piece 38 along taper portion 56, and the inner surface of the material that forms through hole 30. This gap allows upstream chamber piece 38 to expand in diameter along the corners and other geometric features to relieve stress and reduce the likelihood of initiating a propagated crack in the material. Such expansion is possible when upstream chamber piece 38 is formed, for example, from an elastic metal such as stainless steel.

Figure 4A:
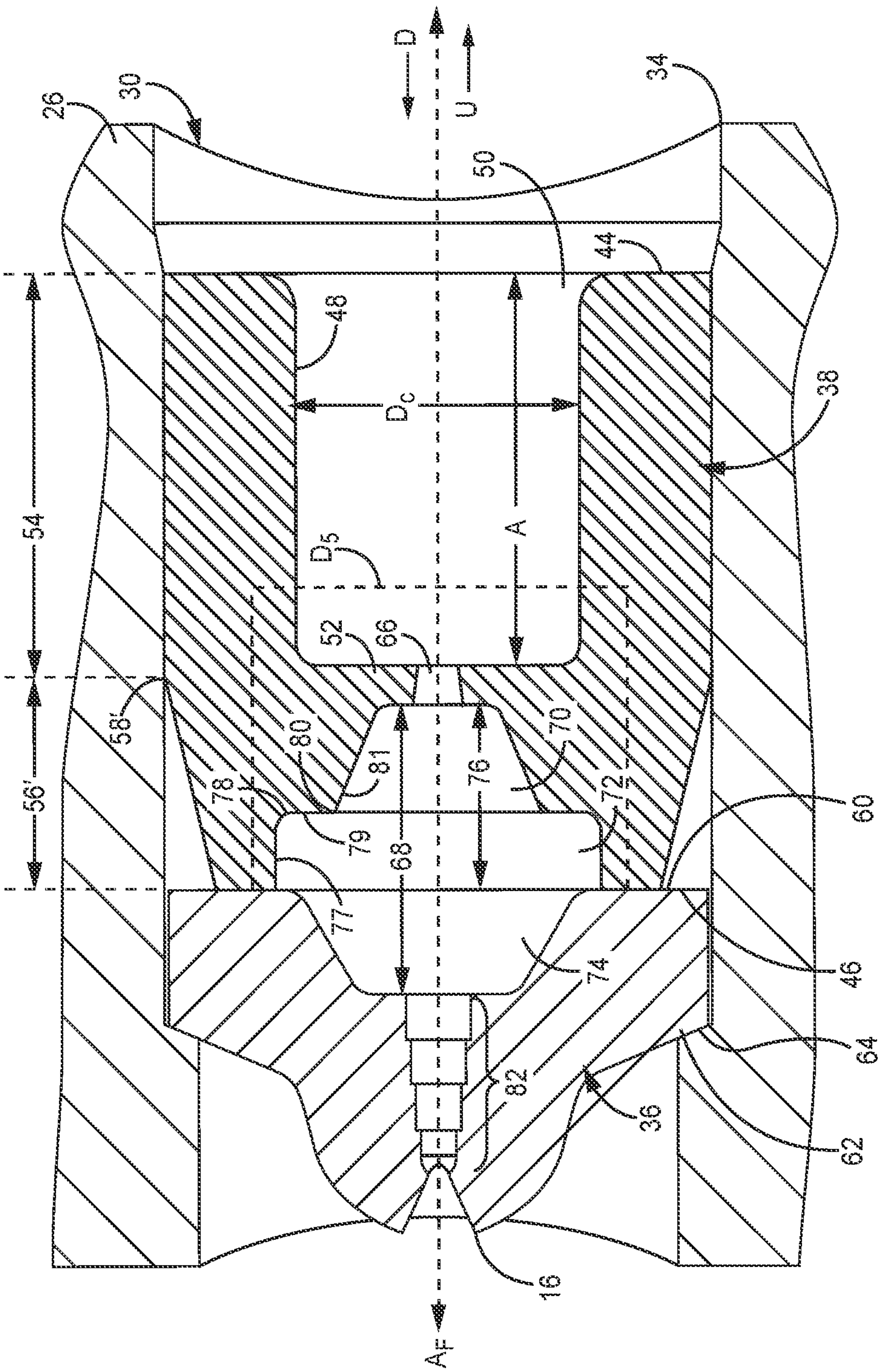
FIG. 4A is a cross-sectional view of an alternative spray tip with an elongated taper portion.

In the embodiment shown, taper edge 58 is located upstream along flow axis $A_F$ with respect to first corner 78 and second corner 80. Taper edge 58 is also located upstream along flow axis $A_F$ with respect to main section 72 of turbulation chamber portion 76. Taper edge 58 overlaps with expansion section 70 of turbulation chamber portion 76. In some embodiments, taper edge 58 can overlap with, or be upstream of aperture 66. FIG. 4A shows taper edge 58' overlapping with aperture 66. Taper portion 56 overlaps with the entirety of main section 72, and part of expansion section 70 of turbulation chamber portion 76. In some embodiments, taper portion 56 can overlap with the entirety of expansion section 70. In some embodiments, such as the embodiment shown in FIG. 4A, taper portion 56, 56' can overlap with all or part of aperture 66, and/or can extend upstream of aperture 66.

Aperture 66 is further discussed below in connection with FIGS. 5 and 6. As previously stated, aperture 66 serves to reduce the area of fluid flow through upstream chamber piece 38, limiting the high-pressure flow from the relatively wide channel 48 into turbulation chamber 68. The geometry of aperture 66 can improve turbulation, which in turn can improve shearing and spray fan development. Preceding the discussion, it may be useful to discuss some dimensions.

Figure 5:
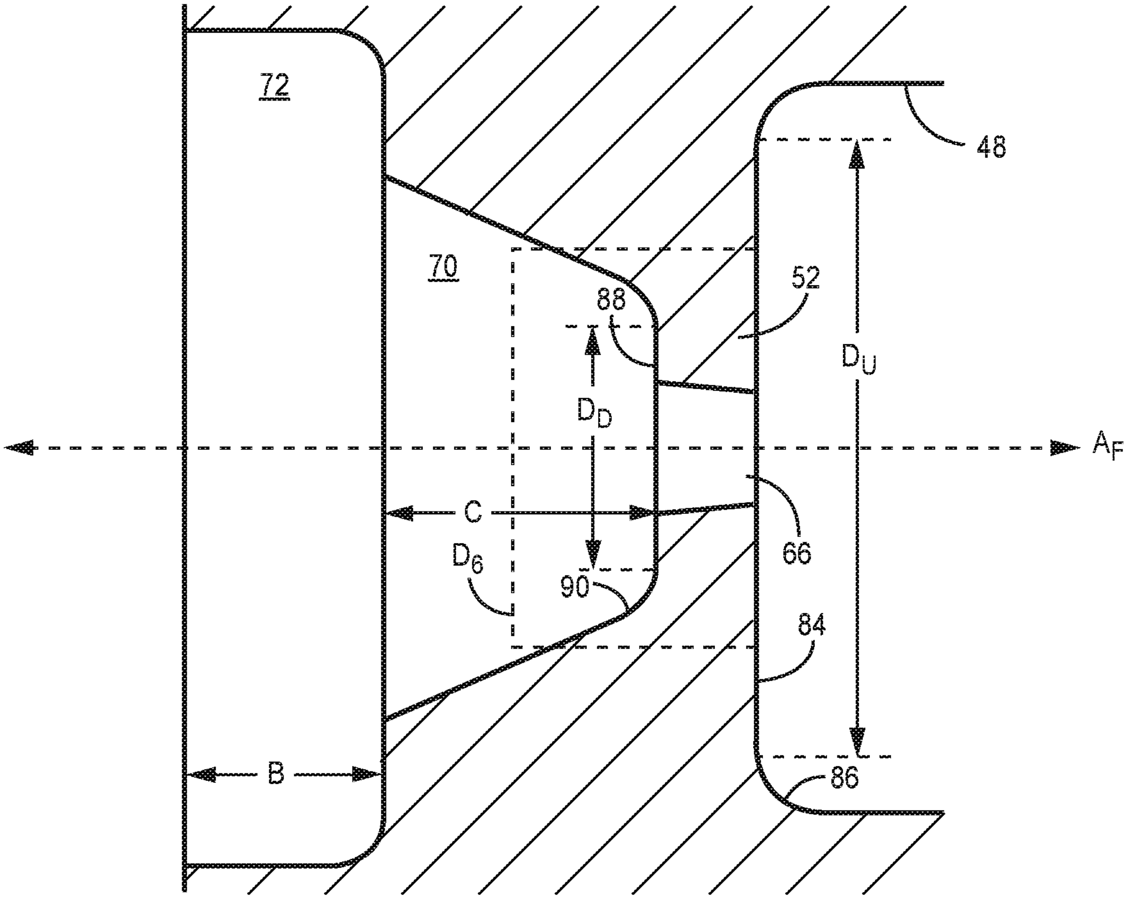
FIG. 5 is an enlarged cross-sectional view of the spray tip including an orifice and a turbulation chamber portion.

FIG. 5 shows detail D5 of FIG. 4, which is an enlarged view of aperture wall 52, and turbulation chamber portion 76. In FIG. 5, the length of main section 72 is marked as dimension B, and can be in the range of 0.00-1.52 mm (0.00-0.06 inches), and preferably, in the range of 0.51-1.02 mm (0.02-0.04 inches). The length of expansion section 70 is marked as dimension C, and can be in the range of 0.76-1.27 mm (0.03-0.05 inches). Dimension Du is the diameter of the flat upstream surface 84 of aperture wall 52. Upstream surface 84 of aperture wall 52 can be generally orthogonal to flow axis $A_F$. As shown, the transition (i.e., corner 86) between the cylindrical inner surface of channel 48 and upstream surface 84 is curved. If corner 86 is not curved, diameter Du of upstream surface 84 would be the same as diameter Dc (shown in FIG. 4) of channel 48. Diameter Du can be at least 1.14 mm (0.045 inch). In some embodiments, diameter Du can be in the range of 1.14-3.81 mm (0.045-0.15 inches), and preferably, in the range of 1.78-3.30 mm (0.07-0.13 inches). Diameter Dc of channel 48 can be in the range of 1.52-4.06 mm (0.06-0.16 inches), and preferably, in the range of 2.29-3.30 mm (0.09-0.13 inches). Dimension DD is the diameter of the flat downstream surface 88 of aperture wall 52. Downstream surface 88 can be generally orthogonal the flow axis $A_F$, and thus parallel to upstream surface 84. Diameter DD can be at least 0.25 mm (0.01 inch). In some embodiments, diameter DD can be in the range of 0.25-1.52 mm (0.01-0.06 inches), and preferably, in the range of 1.02-1.52 mm (0.04-0.06 inches). Diameter DD can be 0-20% larger than diameter DA, discussed below. As shown, the transition (i.e., corner 90) between the conical wall of expansion section 70 and downstream surface 88 is curved. If corner 90 is not curved, diameter DD of downstream surface 88 would be the same as the smallest diameter of expansion section 70. It should be noted that each of diameters Du and DD may still exist even in embodiments where upstream and downstream surfaces 84, 88 are not entirely flat.

Figure 6:
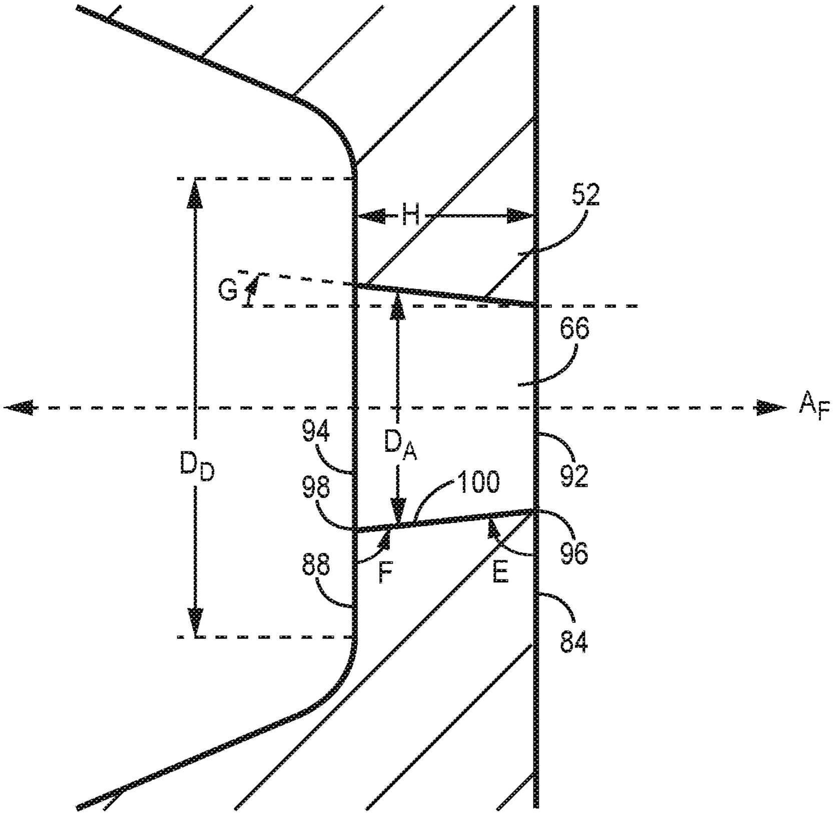
FIG. 6 is an enlarged cross-sectional view of the spray tip focusing on the orifice.

FIG. 6 shows detail D6 of FIG. 5, which is an enlarged view of aperture wall 52 and aperture 66. As shown, aperture 66 includes inlet orifice 92 and outlet orifice 94 located on opposite sides of aperture wall 52. Inlet orifice 92 is defined by annular inlet corner 96. Outlet orifice 94 is defined by annular outlet corner 98. Annular inner surface 100 defines aperture 66. Annular inlet corner 96 is formed by upstream surface 84 of aperture wall 52 and annular inner surface 100. Outlet orifice 94 is defined by annular outlet corner 98. Annular outlet corner 90 is formed by downstream surface 88 of aperture wall 52 and annular inner surface 100 that defines the aperture 66. Each of annular inlet corner 96 and annular outlet corner 98 are pointed in this embodiment, although one or both may be rounded in various other embodiments. The particular geometries of the inlet and outlet corners contribute to flow regulation and destabilization.

As shown in FIG. 6, aperture 66 is not straight, rather, inner surface 100 defining aperture 66 is angled with respect to flow axis $A_F$. Aperture 66 widens in the downstream direction, such that inlet orifice 92 has a smaller diameter than outlet orifice 94, and inner surface 100 is sloped between them. In the embodiment shown, inner surface 100 is sloped linearly between inlet orifice 92 and outlet orifice 94. Inner surface 100 is frustoconical in this embodiment, however other shapes are possible in various other embodiments. For example, inner surface 100 can be curved along flow axis $A_F$ between inlet orifice 92 and outlet orifice 94. The change in diameter through aperture 66, as compared to aperture 66 having a consistent inner diameter along inner surface 100, destabilizes the formation of jet flow through aperture 66 and disrupts laminar flow leading into turbulation chamber 68.

Due to aperture 66 having a widening inner diameter, the angles of the geometric structures of aperture 66 are not right (90 degree) angles. Angle G represents the angle of inner surface 100 between inlet orifice 92 and outlet orifice 94. More specifically, angle G is measured as the smaller angle between inlet corner 96 and outlet corner 98. Angle G can be in the range of 0-6 degrees, more preferably in the range of 3-5 degrees, although even larger angles are possible. Angle E represents the angle between upstream surface 84 and inner surface 100, defining annular inlet corner 96. More specifically angle E is measured in the clockwise direction (as shown in FIG. 6) from upstream surface 84 to inner surface 100, such that it is the smaller of the two angles possible between these features. As shown, angle E is less than 90 degrees. Angle E can be in the range of 84-90 degrees and preferably in the range of 85-87 degrees, depending on the embodiment. Angle F represents the angle between downstream surface 88 and inner surface 100, defining annular outlet corner 98. More specifically angle F is measured in the counterclockwise direction from downstream surface 88 to inner surface 100, such that it is the smaller of the two angles possible between these features. As shown, angle F is greater than 90 degrees. Angle F can be in the range of 90-96 degrees and more preferably in the range of 93-95 degrees, depending on the embodiment. It should be understood that other values for angles E and F are possible, as is discussed below with respect to FIG. 7.

Figure 7:
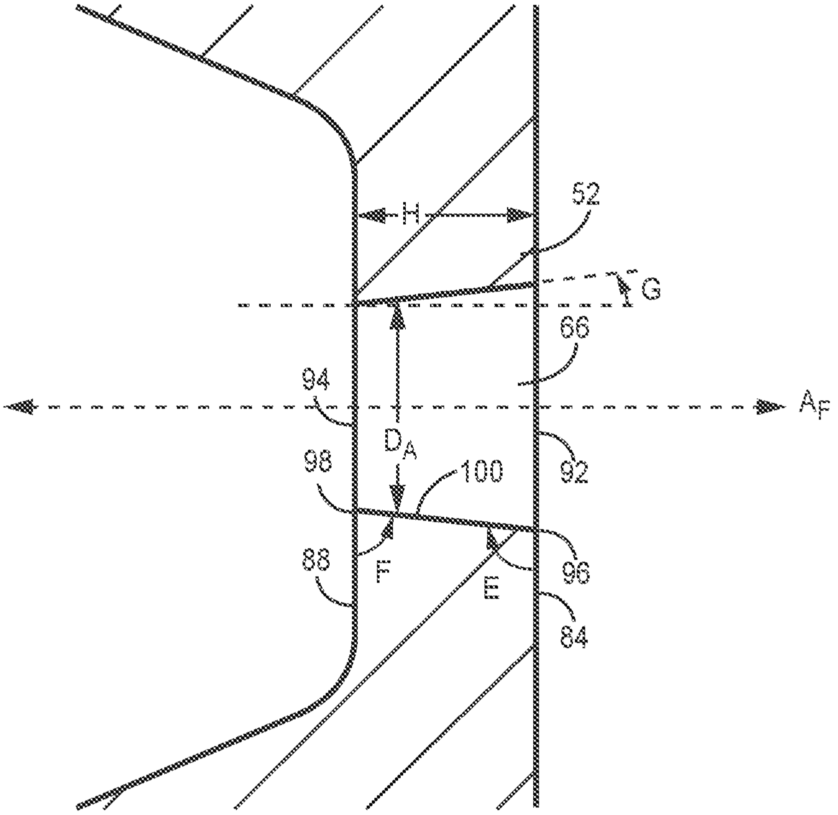
FIG. 7 is a cross-sectional view of a spray tip with an alternative aperture.

In the embodiment of FIG. 7, aperture 66 narrows in the downstream direction, instead of widening in the downstream direction as shown in FIG. 6. In which case, inner diameter ranges and relationships provided above for orifices 90 and 92 are switched. Likewise, the angular relationships and ranges of angles E and F are switched, such that angle E is greater than 90 degrees and angle F is less than 90 degrees. Angle G is measured from outlet orifice 94 with respect to the inner surface 100, and the previously provided ranges could be used.

Aperture diameter DA, represents a diameter along inner surface 100 of aperture 66. Because inner surface 100 can be angled with respect to flow axis $A_F$, diameter DA should be understood to represent any point along aperture 66. As shown in FIG. 6, diameter DA is shown near the widest point of aperture 66 (proximate outlet orifice 94). Even where diameter DA represents the largest diameter of aperture 66, diameter DA can be the smallest internal diameter of upstream chamber piece 38 along flow axis FA. Diameter DA can be twice, three, four, or more times smaller than the next smallest inner diameter of upstream chamber piece 38 in this regard.

Dimension H represents the width or thickness of aperture wall 52 between upstream surface 84 and downstream surface 88, and also the length of aperture 66 along flow axis $A_F$. Dimension H can be in the range of 0.127-0.51 mm (0.005-0.20 inches), and preferably, in the range of 0.203-0.457 mm (0.008-0.018 inches). Diameter DA of aperture 66 can be the same as the thickness of aperture wall 52 (i.e., dimension H). Dimension H can be less than diameter DA. In some embodiments, dimension H can be less than half of diameter DA. The length of the channel 48 (i.e., dimension A) can be over at least twice the length of dimension H. In some embodiments, dimension A can be at least five times the length of dimension H. In some embodiments, dimension A can be over ten times the length of dimension H. The length of expansion section 70 (i.e., dimension C) can be greater than the length of dimension H. Dimension C can be greater than twice the length of dimension H. Dimension C can be greater than three times the length of dimension H. The length of main section 72 (i.e., dimension B) can be greater than dimension H. Dimension B can be more than two or three times greater than dimension H. The length of turbulation chamber portion 76 (i.e., the combination of dimensions B and C) can be greater than dimension H. The combination of dimensions B and C can be two, three or five times greater than dimension H.

Diameter Dc of channel 48 can be greater than the diameter of either of aperture orifices 92 and 94. Diameter Dc can be at least twice the diameter of either of aperture orifices 92 and 94. Diameter Dc can be at least five times the diameter of either of aperture orifices 92 and 94. The diameter Du of upstream surface 84 can be greater than the diameter of either of aperture orifices 92 and 94. In some embodiments, diameter Du can be at least twice the diameter of either of aperture orifices 92 and 94. In some embodiments, diameter Du can be at least three times the diameter of either of aperture orifices 92 and 94. The diameter DD of downstream surface 88 can be greater than the diameter of either of aperture orifices 92 and 94. In some embodiments, diameter DD can be at least twice the diameter of either of aperture orifices 92 and 94. In some embodiments, diameter DD can be at least three times the diameter of either of aperture orifices 92 and 94. The diameter of outlet orifice 16 may be the smallest diameter along the flow path. The diameter of outlet orifice 16 can be smaller than that of either of aperture orifices 92 and 94.

All features and geometries shown herein can be produced by machining blank parts.

Discussion of Possible Embodiments

The following are non-exclusive descriptions of possible embodiments of the present invention.

A spray tip includes a cylindrical body having a through hole oriented along a fluid flow axis, and a spray outlet piece and upstream chamber piece located in the through hole. The spray outlet piece includes an outlet aperture configured to atomize a spray fluid. The upstream chamber piece includes an internal aperture wall with an upstream surface and a downstream surface, and an aperture through the wall. The aperture includes an inlet orifice and an outlet orifice. The spray tip further includes a turbulation chamber defined by the spray outlet piece and the upstream chamber piece.

In the above spray tip, the aperture can include an annular inner surface.

In any of the above spray tips, the inlet orifice can have a first diameter, and the outlet orifice can have a second diameter different from the first diameter.

In any of the above spray tips, the aperture can be frustoconical between the inlet orifice and the outlet orifice.

In any of the above spray tips, the second diameter can be greater than the first diameter.

Any of the above spray tips can further include an annular inlet corner defining the inlet orifice, the annular inlet corner formed by the upstream surface of the aperture wall and the inner annular surface of the aperture, and an annular outlet corner defining the outlet orifice, the annular outlet corner formed by the downstream surface of the aperture wall and the inner annular surface of the aperture. Each of the annular inlet and corner and outlet corner can be 90 degrees.

Any of the above spray tips can further include an annular inlet corner defining the inlet orifice, the annular inlet corner formed by the upstream surface of the aperture wall and the inner annular surface of the aperture, and an annular outlet corner defining the outlet orifice, the annular outlet corner formed by the downstream surface of the aperture wall and the inner annular surface of the aperture. One of the annular inlet corner or the annular outlet corner can be less than 90 degrees and the other of the annular inlet corner or the annular outlet corner can be greater than 90 degrees.

Any of the above spray tips can further include an annular inlet corner defining the inlet orifice, the annular inlet corner formed by the upstream surface of the aperture wall and the inner annular surface of the aperture, and an annular outlet corner defining the outlet orifice, the annular outlet corner formed by the downstream surface of the aperture wall and the inner annular surface of the aperture. One of the annular inlet corner of annular outlet corner can be between 85-87 degrees and the other of the annular inlet corner or the annular outlet corner can be between 93-95 degrees.

In any of the above spray tips, each of the upstream surface and the downstream surface can be flat and parallel with respect to one another.

In any of the above spray tips, each of the upstream surface and the downstream surface can be oriented orthogonal to the fluid flow axis.

In any of the above spray tips, the upstream surface can entirely circumferentially surround an annular inlet corner that defines the aperture, and the downstream surface can entirely circumferentially surround an annular outlet corner that defines the aperture.

In any of the above spray tips, the upstream chamber piece can include a channel upstream of the aperture wall, and the upstream surface can have a diameter extending between opposing corners connecting the upstream surface and an inner surface of the channel.

In any of the above spray tips, the upstream chamber piece can include an expansion section downstream of the aperture wall, and the downstream surface can have a diameter extending between opposing corners connecting the downstream surface and an inner surface of the expansion section.

In any of the above spray tips, the upstream chamber piece can have an exterior surface comprising a retainer portion and a taper portion.

In any of the above spray tips, the retainer portion can include a nominal exterior surface having an outer diameter larger than a nominal inner diameter of an inner surface of the through hole, and the nominal exterior surface of the retainer portion can interface with the inner surface of the through hole to anchor the upstream chamber piece within the through hole.

In any of the above spray tips, the taper portion can radially overlap with a first corner that defines the turbulation chamber.

In any of the above spray tips, the taper portion can radially overlap with a second corner that defines the turbulation chamber.

In any of the above spray tips, the taper portion can radially overlap with a first section and a second section of the turbulation chamber, the inner surfaces of the first and section sections having different diameters and pitches.

In any of the above spray tips, the taper portion can overlap with the aperture.

In any of the above spray tips, the upstream chamber piece can be formed from stainless steel, and the spray outlet piece can be formed from tungsten carbide.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A spray tip comprising:

a cylindrical body having a through hole oriented along a fluid flow axis;

a spray outlet piece located in the through hole, the spray outlet piece having an outlet aperture configured to atomize and output a spray fluid, the spray outlet piece including a domed portion and the outlet aperture having a cat-eye shape and extending into the domed portion;

an upstream chamber piece located in the through hole, the upstream chamber piece comprising:

an internal aperture wall comprising an upstream surface and a downstream surface; and an aperture through the wall, the aperture comprising:

an inlet orifice opening flush with the upstream surface and having a first diameter;

an outlet orifice opening located at the downstream surface and having a second diameter different from the first diameter;

an annular inner surface that is linearly sloped along its entire length between the inlet orifice opening and the outlet orifice opening of the aperture wall;

an annular inlet corner defining the inlet orifice opening, the annular inlet corner defined as a smaller of two angles taken between the upstream surface of the aperture wall and the annular inner surface of the aperture; and an annular outlet corner defining the outlet orifice opening, the annular outlet corner defined as a smaller of two angles taken between the downstream surface of the aperture wall and the annular inner surface;

wherein one of the annular inlet corner or the annular outlet corner is less than 90 degrees; and a turbulation chamber defined by the spray outlet piece and the upstream chamber piece;

wherein the spray tip is rotatable between a spray position and a reversed position in which a direction of flow through the spray tip is reversed for unclogging of the spray tip; and wherein in the spray position, the upstream chamber piece is disposed upstream of the spray outlet piece, and the outlet aperture is disposed downstream of the turbulation chamber and is configured to receive a flow of fluid from the turbulation chamber.

2. The spray tip of claim 1, wherein the second diameter is greater than the first diameter.

3. The spray tip of claim 1, wherein an other of the annular inlet corner or the annular outlet corner is greater than 90 degrees.

4. The spray tip of claim 3, wherein the one of the annular inlet corner or the annular outlet corner is between 85-87 degrees and the other of the annular inlet corner or the annular outlet corner is between 93-95 degrees.

5. The spray tip of claim 1, wherein each of the upstream surface and the downstream surface are flat and parallel with respect to one another.

6. The spray tip of claim 5, wherein each of the upstream surface and the downstream surface are oriented orthogonal to the fluid flow axis.

7. The spray tip of claim 6, wherein the upstream surface entirely circumferentially surrounds the annular inlet corner that defines the aperture, and the downstream surface entirely circumferentially surrounds the annular outlet corner that defines the aperture.

8. The spray tip of claim 7, wherein the upstream chamber piece further comprises a channel upstream of the aperture wall, and wherein the upstream surface has a diameter extending between a first corner and an opposing second corner connecting the upstream surface and an inner surface of the channel.

9. The spray tip of claim 7, wherein the upstream chamber piece further comprises an expansion section downstream of the aperture wall, and wherein the downstream surface has a diameter extending between a first corner and an opposing second corner connecting the downstream surface and an inner surface of the expansion section.

10. The spray tip of claim of claim 9, wherein:

the expansion section is serially fluidly connected with and downstream of the outlet orifice of the aperture;

the expansion section has a length disposed along the flow axis; and the expansion section is frustoconical along the length.

11. The spray tip of claim 1, wherein the upstream chamber piece has an exterior surface comprising a retainer portion and a taper portion.

12. The spray tip of claim 11, wherein the retainer portion comprises a nominal exterior surface having an outer diameter larger than a nominal inner diameter of an inner surface of the through hole, wherein the nominal exterior surface of the retainer portion interfaces with the inner surface of the through hole to anchor the upstream chamber piece within the through hole.

13. The spray tip of claim 11, wherein the taper portion radially overlaps with a first corner that defines the turbulation chamber.

14. The spray tip of claim 11, wherein the taper portion radially overlaps with a second corner that defines the turbulation chamber.

15. The spray tip of claim 11, wherein the taper portion radially overlaps with a first section and a second section of the turbulation chamber, the inner surfaces of the first and section sections having different diameters and pitches.

16. The spray tip of claim 11, wherein the taper portion radially overlaps with the aperture.

17. The spray tip of claim 1, wherein the upstream chamber piece is formed from stainless steel, and wherein the spray outlet piece is formed from tungsten carbide.

18. The spray tip of claim 1, wherein the annular inlet corner is less than 90 degrees, and wherein the annular outlet corner is greater than 90 degrees.

19. The spray tip of claim 1, wherein the annular inlet corner is greater than 90 degrees, and wherein the annular outlet corner is less than 90 degrees.

20. A spray tip comprising:

a cylindrical body having a through hole oriented along a fluid flow axis;

a spray outlet piece located in the through hole, the spray outlet piece having an outlet aperture configured to atomize and output a spray fluid, the spray outlet piece including a domed portion and the outlet aperture having a cat-eye shape and extending into the domed portion;

an upstream chamber piece located in the through hole, the upstream chamber piece comprising:

an internal aperture wall comprising an upstream surface and a downstream surface; and an aperture through the wall, the aperture comprising:

an inlet orifice opening flush with the upstream surface and having a first diameter;

an outlet orifice opening located at the downstream surface and having a second diameter different from the first diameter;

an annular inner surface that is linearly sloped along its entire length between the inlet orifice opening and the outlet orifice opening of the aperture wall;

an annular inlet corner defining the inlet orifice opening, the annular inlet corner defined as a smaller of two angles taken between the upstream surface of the aperture wall and the annular inner surface of the aperture; and an annular outlet corner defining the outlet orifice opening, the annular outlet corner defined as a smaller of two angles taken between the downstream surface of the aperture wall and the annular inner surface;

wherein one of the annular inlet corner or the annular outlet corner is less than 90 degrees, and wherein the other of the annular inlet corner or the annular outlet corner is greater than 90 degrees; and a turbulation chamber defined by the spray outlet piece and the upstream chamber piece, the turbulation chamber comprising:

an expansion section serially fluidly connected with and downstream of the outlet orifice opening of the aperture; and a reduction section downstream of the expansion section and upstream of the outlet aperture of the spray outlet piece;

wherein the expansion section has a length disposed along the flow axis;

wherein the expansion section is frustoconical along the length and expands in a downstream direction; and wherein the reduction section is frustoconical and narrows in the downstream direction;

wherein the outlet aperture is disposed downstream of the turbulation chamber and is configured to receive a flow of fluid from the turbulation chamber.

21. A spray tip comprising:

a cylindrical body having a through hole oriented along a fluid flow axis;

a spray outlet piece located in the through hole, the spray outlet piece having an outlet aperture configured to atomize and output a spray fluid, the spray outlet piece including a domed portion and the outlet aperture having a cat-eye shape and extending into the domed portion;

an upstream chamber piece located in the through hole, the upstream chamber piece comprising:

an internal aperture wall comprising a flat upstream surface and a flat downstream surface, each of the upstream surface and the downstream surface being orthogonal with respect to the fluid flow axis; and an aperture through the wall, the aperture comprising:

an inlet orifice opening flush with the upstream surface and having a first diameter;

an outlet orifice opening located at the downstream surface and having a second diameter different from the first diameter;

an annular inner surface that is linearly sloped along its entire length between the inlet orifice opening and the outlet orifice opening of the aperture wall;

an annular inlet corner defining the inlet orifice opening, the annular inlet corner defined as a smaller of two angles taken between the upstream surface of the aperture wall and the annular inner surface of the aperture; and an annular outlet corner defining the outlet orifice opening, the annular outlet corner defined as a smaller of two angles taken between the downstream surface of the aperture wall and the annular inner surface;

wherein one of the annular inlet corner or the annular outlet corner is less than 90 degrees; and a turbulation chamber defined by the spray outlet piece and the upstream chamber piece;

wherein the spray tip is rotatable between a spray position and a reversed position in which a direction of flow through the spray tip is reversed for unclogging of the spray tip; and wherein in the spray position, the upstream chamber piece is disposed upstream of the spray outlet piece, and the outlet aperture is disposed downstream of the turbulation chamber and is configured to receive a flow of fluid from the turbulation chamber.

* * * * *